No. 816,766. PATENTED APR. 3, 1906.
W. H. WEASER.
EYEGLASSES.
APPLICATION FILED OCT. 23, 1905.
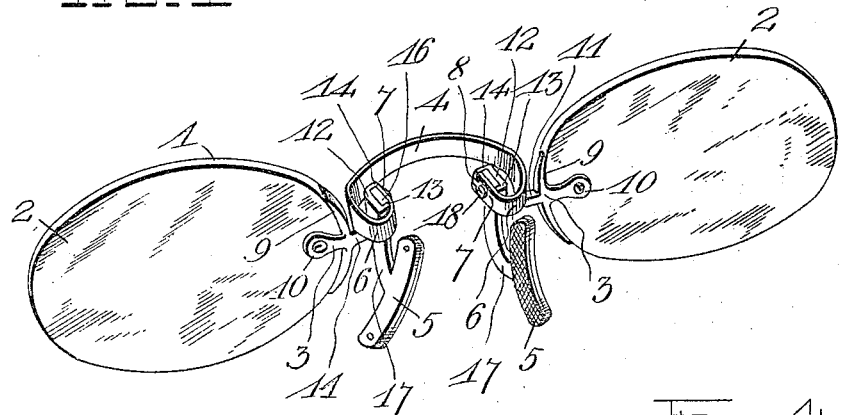
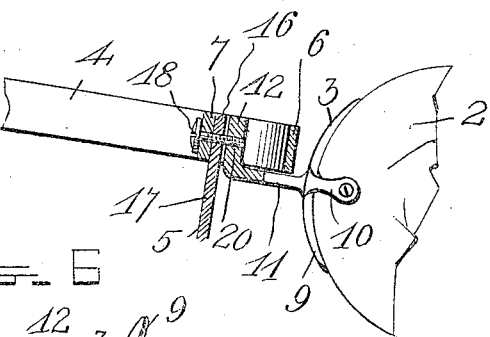
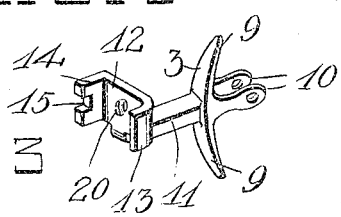
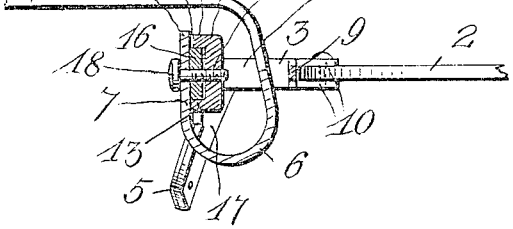
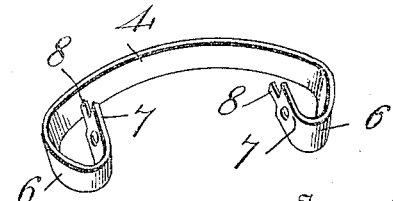
Witnesses
Inventor
William H. Weaser
by
Attorney

UNITED STATES PATENT OFFICE.

WILLIAM H. WEASER, OF PITTSFIELD, MASSACHUSETTS.

EYEGLASSES.

No. 816,766.  Specification of Letters Patent.  Patented April 3, 1906.

Application filed October 23, 1905. Serial No. 283,990.

*To all whom it may concern:*

Be it known that I, WILLIAM H. WEASER, a citizen of the United States, residing at Pittsfield, in the county of Berkshire and State of Massachusetts, have invented certain new and useful Improvements in Eyeglasses; and I do declare the following to be a full, clear, and exact description of the invention, such as will enable others skilled in the art to which it appertains to make and use the same.

My invention relates to improvements in eyeglasses, and more particularly to the spring-bridges thereof and the manner of mounting the same.

The object of the invention is to provide a spring-bridge of great resiliency which will be disposed horizontally, so that the glasses will be held properly upon the nose and without discomfort to the wearer.

With the above and other objects in view the invention consists of certain novel features of construction, combination, and arrangement of parts, as will be hereinafter more fully described and claimed.

In the accompanying drawings, Figure 1 is a perspective view of a pair of eyeglasses constructed in accordance with my invention. Fig. 2 is a detail transverse sectional view through the same. Fig. 3 is a detail sectional view taken on the plane indicated by the line 3 3 in Fig. 2, the bridge-spring being shown partly in section. Fig. 4 is a similar sectional view taken on the line 4 4 in Fig. 2. Fig. 5 is a perspective view of the spring or bridge, and Fig. 6 is a similar view of one of the lens studs or brackets.

Referring to the drawings by numeral, 1 denotes a pair of eyeglasses which consists of lenses 2, lens studs or mounts 3, a connecting spring or bridge 4, and nose clamps or guards 5. The spring or spring-bridge 4 is adapted to be disposed horizontally and consists of a strip or piece of resilient metal which has a slight longitudinal curvature and which has its ends curved or bent inwardly to form resilient loops 6 and substantially parallel and forwardly-extending end portions 7, which latter are formed with projecting tongues 8, said forwardly-extending inwardly-bent ends of the bridge-spring lying in the same horizontal plane with the intermediate portion of said spring. The lens studs or mounts 3 are in the form of brackets which have the usual lens edge bearing 9 and apertured ears 10 to receive a screw or pin which screws the bracket to the lens. Each of the brackets has a projecting arm 11, which has its outer end enlarged to form a socket 12. The latter is formed on the inner face of each arm by parallel flanges 13 14, the latter of which is of greater height than the former and is formed at its center with a notch or recess 15, adapted to receive the tongue 8 on one of the ends 7 of the spring-bridge. The nose guards or clamps 5 are of the usual form and construction and have enlargements 16 on the outer ends of their arms 17, adapted to seat in the sockets 12, formed between the two flanges 13 and 14. The thickness of the enlargement 16 corresponds to the height of the innermost flange 13 of each socket, and the height of the outermost flange 14 corresponds to the combined thickness of one of the enlargements 16 and one end of the spring, so that when the parts are assembled, as shown in Figs. 2 and 3 of the drawings, the tongue 8 upon the end 7 of the spring will enter the notch or recess 15 in the flange 14. Each of the sockets 12 is formed with a centrally-disposed screw-threaded opening 20, adapted to receive the threaded end of a screw 18, which passes through alining openings formed in the end 7 of the spring and in the enlargement 16 of the arm of one of the nose-guards. The parts are thus held rigidly in position and cannot turn or twist. By constructing and mounting the spring or spring-bridge 4 in this manner it will be seen that the loops 6 will permit the nose guards or clamps to readily yield, so that they will retain the eyeglass upon the nose, but will not pinch or cut the latter.

It will be observed by referring to the drawings that the socket portions of the lens-studs and the upper ends of the arms of the nose-guards lie in the loops in the bridge-spring formed by the forwardly-extending inturned ends thereof.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention.

Having thus described my invention, what I claim as new, and desire to secure by Letters Patent, is—

The herein-described eyeglasses, comprising the horizontally-disposed spring having its end bent or coiled inwardly and extending forwardly, lens-studs, each having an arm 11 bearing against the under side of the spring and having an upturned end disposed in one of the loops formed between the end and adjacent portion of the spring-bridge and secured to said end thereof, and nose-guards each having an upwardly-extending arm 17 secured between said upturned end of one of the lens-studs and the adjacent end of the spring-bridge, substantially as described.

In testimony whereof I have hereunto set my hand in presence of two subscribing witnesses.

WILLIAM H. WEASER.

Witnesses:
GEORGE E. HAYNES,
RICHARD E. CLARY.